June 15, 1926.
R. B. OWEN
ELECTRIC BATTERY
Filed March 29, 1922
1,588,803
2 Sheets-Sheet 1
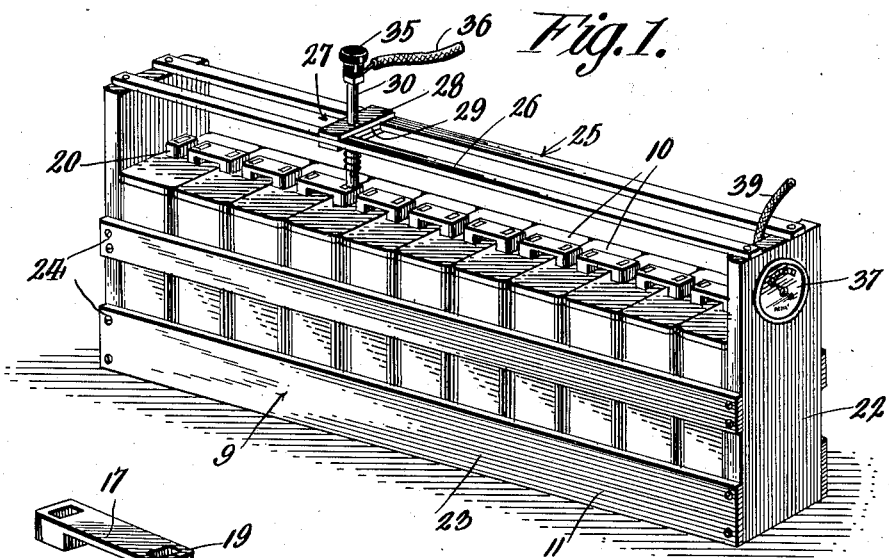
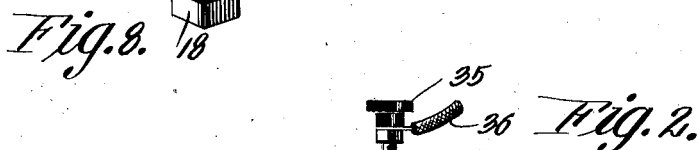
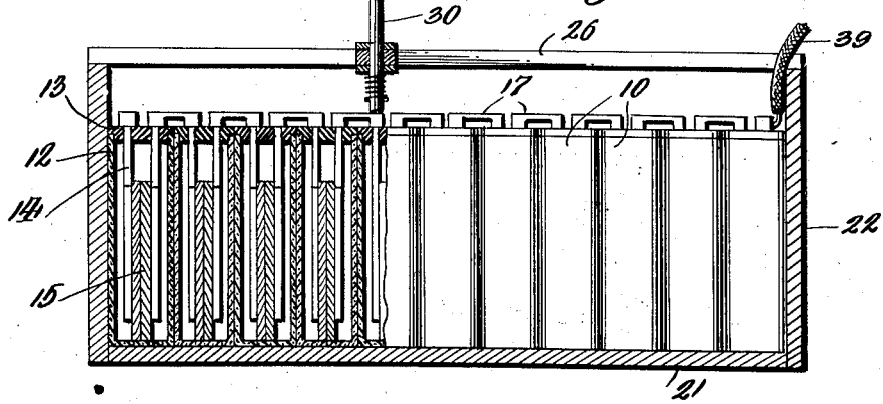
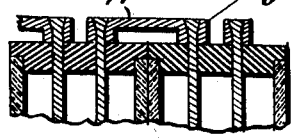
Inventor
Richard B. Owen

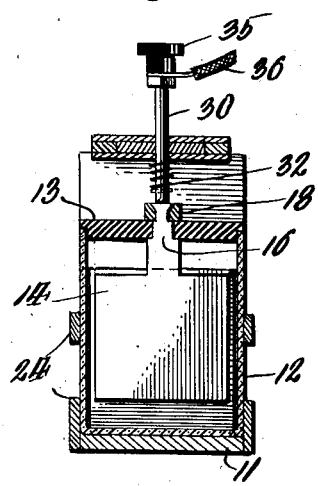
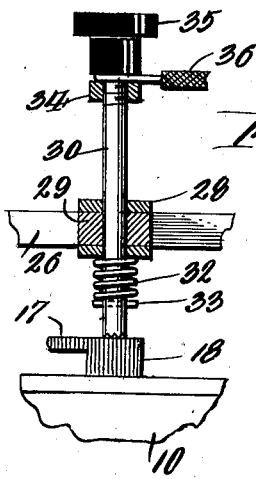
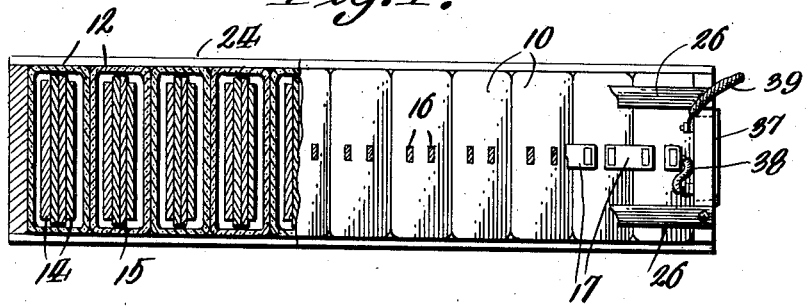

Patented June 15, 1926.

1,588,803

UNITED STATES PATENT OFFICE.

RICHARD B. OWEN, OF WASHINGTON, DISTRICT OF COLUMBIA.

ELECTRIC BATTERY.

Application filed March 29, 1922. Serial No. 547,823.

This invention relates to new and useful improvements in electric batteries, the primary object of the invention being to provide means for selectively using any number of the cells of the battery that may be desired.

Another object of the invention resides in the provision of a plurality of interconnected cells, and selector means whereby any number of the cells of the battery may be introduced into, or eliminated from, an electric circuit.

A further object of the invention is to provide a device of the above nature having selector means whereby any one or any group of the cells of the battery may be used independently of the other cells.

A still further object of the invention resides in the provision of a battery of the above named character which is strong, durable, inexpensive to manufacture and extremely convenient to use.

Other objects and advantages of the invention will become apparent during the course of the following description.

In the accompanying drawings, forming a part of the description and wherein like numerals are employed to designate like parts throughout the several views, Figure 1 is a perspective view of my improved battery, Figure 2 is a fragmentary longitudinal section through the same, parts thereof being broken away, Figure 3 is a transverse section through the battery, Figure 4 is a top plan of the battery, parts thereof being broken away, Figure 5 is an enlarged section of a pair of battery units, or cells, illustrating my preferred manner of supporting the electrodes, and interconnecting the battery units.

Figure 6 is an enlarged sectional view of the movable contact maker,

Figure 7 is an elevation of the contact end of the contact maker, and

Figure 8 is a perspective view of a strap used for interconnecting a pair of adjacent battery units or cells.

Referring to the drawings wherein for the purpose of illustration I have shown the embodiment of my invention which is illustrative thereof, the numeral 9 designates the battery in its entirety, it consisting of a plurality of distinct battery units or cells 10. These cells are arranged, in the present instance, with their adjacent sides abutting, but it is to be understood that I do not limit the invention to this arrangement as the same is illustrated in this manner to show one application of the invention. The battery units are prevented from relative movement by being positioned in a case 11 adapted to snugly receive the same. In the present instance eleven cells of approximately two volts each, are adapted to be received in the case, it being customary to use about twenty-two volts in a so-called "tube circuit" of a receiving set of a radio station, but obviously the number may be varied. Although the independent battery units 10 may be either of the dry or wet cell type, I have shown them in the present instance as being wet cells of the storage battery type, since several advantages are derived from the use of storage battery cells which are not obtained from dry cells of the ordinary type now used for various purposes.

As all of the cells of my present battery are of similar construction, a description of one will suffice for all. This type of storage battery cell consists of a jar or container 12 having its upper end open for the reception of a cover 13 of insulating material, which in the present instance is provided with a pair of spaced apertures for the passage therethrough of the upper ends of terminal posts or electrodes 14 of opposite polarity so that their upper ends extend a distance above the cover. The electrodes, are of course, submerged in an electrolyte in the jar and are retained in spaced relation to each other to prevent short circuiting by a separator 15 disposed therebetween.

As best seen in Fig. 3, each electrode consists in the present instance of a plate, the upper edge of which between its ends is provided with an upstanding extension 16 which forms a pole or terminal post of the cell and which may be provided with a shoulder to abut the under face of its cover 13. In order to support the electrodes with the shoulders of the extensions abutting the cover, the extensions of plates of opposite polarity of adjacent battery cells, are connected by a cell connecting strap 17. A plurality of these straps are used in my present battery to electrically interconnect the battery cells.

Each strap 17 consists of a casting of lead or lead alloy, the upper surface of which is perfectly flat, while the under face thereof at each end is provided with a depending solid portion 18 adapted to rest on the covers of adjacent battery cells directly over the openings in the covers through which the extensions 16 of the electrodes protrude. An opening 19 extends through each end of the strap 17 and through the depending portion 18 thereof for registry with its respective cover opening to receive the upper end of an extension 16 of an electrode. The upper ends of the openings 19 in the straps are countersunk as clearly seen in Figs. 3 and 4, so that when the upper ends of the extensions 16 of the various electrodes are melted by the application of heat, the material which formed the upper ends of the extensions will melt down into the openings 19 of the various straps and form shoulders whereby the electrodes will be supported by the straps and the latter will be prevented from accidental displacement from the terminal posts 16 of the cells. From the foregoing it will be obvious that each independent battery unit or cell 10 will be provided with a pair of upstanding posts or poles of opposite polarity and each pole is connected by a strap 17 to a pole of opposite polarity of an adjacent cell. There will be one pole of each end battery cell disconnected from any other pole of the battery, and a collar 20 formed with a countersunk opening therein is adapted to be retained upon the upper extended end of each of said poles or electrodes to support the same within its respective container or jaw 12. All of the straps or connectors 17 extend longitudinally of the battery and in alinement as clearly shown in Fig. 1. The ends of the various connectors 17 are, of course, spaced apart for obvious reasons and the space between each pair is made wide enough to permit the passage of a selector member 30 and its engagement with the cover of any cell when it is desired to cut off the current from the battery.

The case 11 for containing the various battery cells 10 and for preventing their relative accidental movement consists of a crate like structure in the present illustration, embodying a bottom 21, end walls 22 and sides 23. The sides 23 are each made up of a pair of spaced longitudinally extending bars 24 connected at their ends to the end walls 22. These end walls extend above the sides of the crate and also above the battery cells 10 whereby a guide 25 may be fastened to the extended ends of the walls and be arranged above the battery cells to extend longitudinally thereof. Although the guide may assume various forms, I have shown the same in the present instance as consisting of a pair of spaced parallel bars 26 having their ends connected to the upper ends of the end walls 22.

In order that any desired number of the cells of the battery may be introduced into or eliminated from an electrical circuit including the battery, I provide selector means which consists in the present instance of a movable terminal 27 for the battery slidably engaged with the guide bars 26. A carrier for the selector includes a pair of plates 28 secured to opposite faces of a plate 29; all three plates having apertures therein which register for the reception of a vertically movable post or contact maker 30. The plate 29 terminates short of the ends of the plates 28 so that the ends of the latter are retained in spaced relation to receive therebetween portions of the guide bars 26. As will be obvious from the arrangement of the plates 28 and 29, a substitute therefor can be made from a single block of material having a central opening for the reception of the vertically movable post, and the opposite ends grooved to be slidably engaged with the guide bars 26.

The ends of the vertically movable post projects above and below the selector carrier, the end of the post below the same being corrugated or serrated as at 31, so that when the post is engaged with any of the straps 17, a good electrical contact will be established. This lower corrugated end of the contact maker post is normally urged downwardly for engagement with the various straps of poles of the battery by a coil spring 32 on the post having one end abutting the selector carrier and its other end abutting a pin 33 extending through the post.

The upper end of the post is threaded as seen in Fig. 6 for the reception of a metallic nut 34 and a nut 35 which may be of insulating material and which forms a finger grip upon the upper end of the post. A conductor wire 36 may be clamped between the nuts 34 and 35 to connect the battery to its circuit.

In order that the voltage of the current passing from the battery may be determined at sight, a voltmeter 37 may be secured to one end wall 22 of the case 11 with its binding posts extending through the same. One of these posts is connected by a conductor 38 to a pole of the adjacent end cell, while the other post has connection with a conductor 39 included in the circuit.

From the foregoing description it will be seen that the current may be selectively taken from the battery in the voltage desired by simply moving the selector 30 along the guide 25 and permitting it to engage with any selected pole of the battery. For instance, if it is desired to obtain current from only one cell, the selector carrier is moved toward the voltmeter end of the case by lifting up the post 30 against the tension of the coil spring and moving the same longitudinally of the guide 25, until the post is disposed directly over the second pole of the end cell adjacent the voltmeter. When the grip 35 is released the coiled spring 32 expands and forces the post downwardly into engagement with the pole of the selected battery cell. The leads 36 and 39 are connected in the same circuit, and it will be seen that as soon as the lower end of the selector post engages the proper pole of the battery, a complete circuit will be established.

Should current possessing a higher voltage be desired, the grip 35 is grasped and lifted to cause the post 30 to move upwardly so that its lower end will be free from the poles or straps of the battery after which the carrier 27 is moved longitudinally of the guide bars 26 until the post is disposed above the pole of the battery cell with which it is desired to engage the same. The grip 35 is then released to permit the post to move downwardly into engagement with the pole or strap whereby the circuit is completed.

Instead of connecting the lead 39 directly to a pole of an end cell, it may be connected to a second movable contact maker or selector, not shown, so that in case the end cell or any cell included in an electrical circuit should become defective the lead 39 can be easily associated with a live cell to eliminate the defective one from the circuit.

Consequently, it will be seen that when any of the cells become defective, they can be readily removed from the circuit for repairs without interfering with the operation of the battery.

The foregoing description and the accompanying drawings have reference to the preferred or approved embodiment of my invention. It is to be understood however, that such changes may be made in construction and arrangement of parts, materials, dimensions, etc., as may prove expedient and fall within the scope of the appended claims.

Having thus described and illustrated my invention, what I claim is:—

1. An electric battery including a plurality of interconnected cells, and a selector contact means movable in a predetermined path parallel to the poles of the cells and engageable with any of the poles for regulating the voltage of current passing from the battery.

2. An electric battery including a plurality of interconnected cells, a movable contact maker engageable with any selected pole of the cells, guide means associated with the battery for guiding said contact maker into proximity with all of said poles and means for normally urging the contact maker into engagement with any selected pole.

3. An electric battery comprising a plurality of interconnected cells, guide means associated therewith, a contact carrier movably associated with the guide means, and a movable contact maker mounted on the carrier and being engageable with any of the poles of the cells to regulate the voltage of current passing from the battery.

4. An electric battery comprising a case, a plurality of interconnected cells positioned therein, the end walls of the case being extended above the tops of the cells, guide means supported by said end walls of the cells, and a movable contact slidably mounted upon the guide means and being engageable with any selected pole of the cells to regulate the voltage of current passing therefrom.

5. An electric battery comprising a case, a plurality of interconnected cells positioned therein, a pair of spaced parallel guide bars associated with the case, a contact carrier movably associated with said guide bars, and a contact maker mounted in the carrier and movable relative thereto, and means associated with the contact maker for normally urging the same toward the cells, and into engagement with any selected pole thereof.

6. An electric battery comprising a plurality of interconnected cells, guide means associated therewith, a contact carrier movably associated with the guide means, a spring pressed contact post mounted in the carrier and normally urged toward the cells, and the upper ends of said post being provided with an insulating member adapted to form a grip for the post.

7. An electric battery including a plurality of interconnected cells, a pair of terminals for said cells, and one of the terminals being movable and engageable with any selected pole of the cells and normally forced into engagement with one of said poles.

8. An electric battery comprising a plurality of cells, straps connecting the poles of opposite polarity thereof, and a movable contact maker normally urged toward said cells and adapted to engage any selected strap for selectively including any number of said cells in the battery.

9. An electric battery comprising a plurality of interconnected cells, guide means extending parallel to the cells, a pair of terminals for the battery, and one of said terminals being movably associated with the guide means for conveyance to any one of said cells and being engageable with any selected pole of the cells.

10. An electric battery comprising a case, a plurality of interconnected cells positioned therein, a pair of spaced parallel guide bars arranged above the cells, a contact carrier having opposite ends grooved for slidable association with the guide bars, and a spring pressed contact maker carried by the carrier and normally urged into engagement with any selected pole of the cells.

In testimony whereof, I affix my signature.

RICHARD B. OWEN.